United States Patent
Sung et al.

(10) Patent No.: US 10,798,660 B1
(45) Date of Patent: Oct. 6, 2020

(54) TECHNIQUES FOR DEVICE-TO-DEVICE FREQUENCY REUSE IN CELLULAR NETWORKS

(71) Applicant: Sprint Spectrum LP, Overland Park, KS (US)

(72) Inventors: Sanghoon Sung, Ashburn, VA (US); Udit Thakore, Fairfax, VA (US); Hau Tran, Centreville, VA (US); Yun Sung Kim, Ashburn, VA (US)

(73) Assignee: Sprint Spectrum L.P., Overland Park, KS (US)

( * ) Notice: Subject to any disclaimer, the term of this patent is extended or adjusted under 35 U.S.C. 154(b) by 198 days.

(21) Appl. No.: 15/800,527

(22) Filed: Nov. 1, 2017

Related U.S. Application Data

(63) Continuation of application No. 14/970,892, filed on Dec. 16, 2015, now Pat. No. 9,838,978.

(51) Int. Cl.
  *H04W 52/26* (2009.01)
  *H04L 5/14* (2006.01)
  *H04W 72/12* (2009.01)
  *H04W 16/14* (2009.01)
  *H04W 52/24* (2009.01)

(52) U.S. Cl.
  CPC ............ *H04W 52/262* (2013.01); *H04L 5/14* (2013.01); *H04W 16/14* (2013.01); *H04W 52/244* (2013.01); *H04W 72/1268* (2013.01)

(58) Field of Classification Search
  CPC ..... H04W 52/00; H04W 72/00; H04W 16/00; H04L 5/00
  See application file for complete search history.

(56) References Cited

U.S. PATENT DOCUMENTS

| | | | |
|---|---|---|---|
| 8,521,158 B2 | 8/2013 | Karpoor | |
| 8,942,173 B2 | 1/2015 | Li et al. | |
| 9,655,039 B2 | 5/2017 | Krishnamoorthy | |
| 9,838,978 B1* | 12/2017 | Sung | H04W 52/262 |
| 2011/0165903 A1* | 7/2011 | Selen | H04W 16/14 455/509 |
| 2011/0170515 A1* | 7/2011 | Kim | H04W 4/70 370/330 |
| 2011/0275379 A1* | 11/2011 | Hakola | H04W 72/0486 455/450 |

(Continued)

FOREIGN PATENT DOCUMENTS

WO     2015028357 A1     3/2015

*Primary Examiner* — Jamaal Henson

(57) ABSTRACT

Device-to-device (D2D) transmissions by a wireless device may interfere with base station reception of other signals. To mitigate this interference, the wireless device estimates the path loss between itself and the base station. The path loss and the current D2D transmission power level are used to estimate the amount of interference the base station is experiencing as a result of the D2D transmissions from the wireless device. Based on the estimated interference experienced by the base station, the wireless device increases the robustness of the MCS being used and decreases the transmission power level by a corresponding amount. By decreasing the D2D transmission power level, less interference will be experienced by the base station. By increasing the robustness of the MCS, the impact of the reduced D2D transmission power level is mitigated.

20 Claims, 7 Drawing Sheets

(56) References Cited

U.S. PATENT DOCUMENTS

| | | | |
|---|---|---|---|
| 2011/0306349 A1* | 12/2011 | Hakola | H04W 28/04 455/450 |
| 2012/0135728 A1 | 5/2012 | Karpoor | |
| 2013/0148637 A1* | 6/2013 | Yang | H04W 72/044 370/336 |
| 2013/0170387 A1* | 7/2013 | Wang | H04W 4/70 370/252 |
| 2013/0230032 A1* | 9/2013 | Lu | H04W 52/16 370/336 |
| 2013/0244715 A1* | 9/2013 | Kwon | H04W 52/242 455/522 |
| 2013/0272196 A1 | 10/2013 | Li et al. | |
| 2013/0294247 A1* | 11/2013 | Zhu | H04W 72/0486 370/235 |
| 2013/0322413 A1* | 12/2013 | Pelletier | H04W 76/14 370/336 |
| 2014/0036820 A1* | 2/2014 | McNamara | H04L 5/0091 370/329 |
| 2014/0141789 A1* | 5/2014 | Tarokh | H04W 52/04 455/450 |
| 2014/0153390 A1* | 6/2014 | Ishii | H04W 52/383 370/230 |
| 2014/0328329 A1* | 11/2014 | Novlan | H04W 56/0015 370/336 |
| 2014/0376458 A1* | 12/2014 | Ryu | H04W 72/085 370/329 |
| 2014/0378150 A1* | 12/2014 | Li | H04W 72/085 455/450 |
| 2015/0043444 A1* | 2/2015 | Wei | H04W 76/14 370/329 |
| 2015/0050929 A1* | 2/2015 | Song | H04W 52/383 455/426.1 |
| 2015/0078270 A1* | 3/2015 | Seo | H04W 52/248 370/329 |
| 2015/0103789 A1* | 4/2015 | Tanaka | H04W 72/0426 370/329 |
| 2016/0381630 A1 | 12/2016 | Krishnamoorthy | |
| 2017/0013661 A1* | 1/2017 | Kalhan | H04W 72/0493 |

\* cited by examiner

TECHNIQUES FOR DEVICE-TO-DEVICE FREQUENCY REUSE IN CELLULAR NETWORKS

This patent application is a continuation of U.S. patent application Ser. No. 14/970,892, filed on Dec. 16, 2015, entitled TECHNIQUES FOR DEVICE-TO-DEVICE FREQUENCE REUSE IN CELLULAR NETWORKS.

TECHNICAL BACKGROUND

Wireless communication networks are widely deployed to provide communication services to both fixed and mobile devices. These services can include voice, data, video, messaging, web browsing, etc. Wireless communication has certain advantages, such as mobility, over wired communications for accessing a network. Various wireless standards have been adopted or proposed for wireless networks. These standards include 802.11 (WiFi), 802.16 (WiMAX), TIA-856 (which is also known as Evolution-Data Optimized—EV-DO), and long term evolution (LTE). Additional standards such as the fifth generation communication system (5G) are also being pursued.

Because of transmit power regulations, limited frequency allocations, interference, and/or radio wave propagation characteristics, it is desirable to implement the concept of device-to-device (D2D) communication for wireless devices (a.k.a., user equipment—UE.) D2D communication is a peer to peer link which does not use the entire cellular network infrastructure, but enables wireless devices to communicate directly with one another when they are in proximity to each other. One of the particular applications for D2D communications is for emergency services. D2D communication is also being investigated for applications where peer discovery is required for commercial applications in the presence of network support. Another use for D2D communication is to improve user data speed, and extend cellular coverage. However, wireless devices that are engaged in D2D communication can cause interference to other devices and/or base stations.

OVERVIEW

In an embodiment, a method of operating a communication system includes receiving, by a first wireless device, a first indicator corresponding to an access node transmission power. The first wireless device measures a second indicator corresponding to a received signal power from the access node. Based on the first indictor and the second indicator, an estimated signal strength of a transmission from the first wireless device arriving at the access node is calculated. Based on the estimated signal strength, a modulation and coding rate (MCS) for use by the first wireless device to transmit directly to a second wireless device selected.

In an embodiment, a method of operating a communication system, includes configuring a first wireless device to communicate directly with a second wireless device. Uplink air-interface resources are scheduled among a plurality of wireless devices. The first wireless device receives a plurality of indicators of scheduled uplink air-interface resource. The pluralities of indicators are used to determine, by the first wireless device, at least one unscheduled uplink air-interface resource. The first wireless device communicates directly with the second wireless device using the at least one unscheduled uplink air-interface resource.

In an embodiment, a communication system comprises an access node to send indicators of scheduled uplink air-interface resources to a plurality of wireless devices. The plurality of wireless devices includes a first wireless device and a second wireless device. The first wireless device is configured to receive the indicators of scheduled uplink air-interface resources. Using these indicators, the first wireless device determines at least one unscheduled uplink air-interface resource that can be used by the first wireless device for device-to-device communication between the first wireless device and the second wireless device.

DETAILED DESCRIPTION

Figure 1:
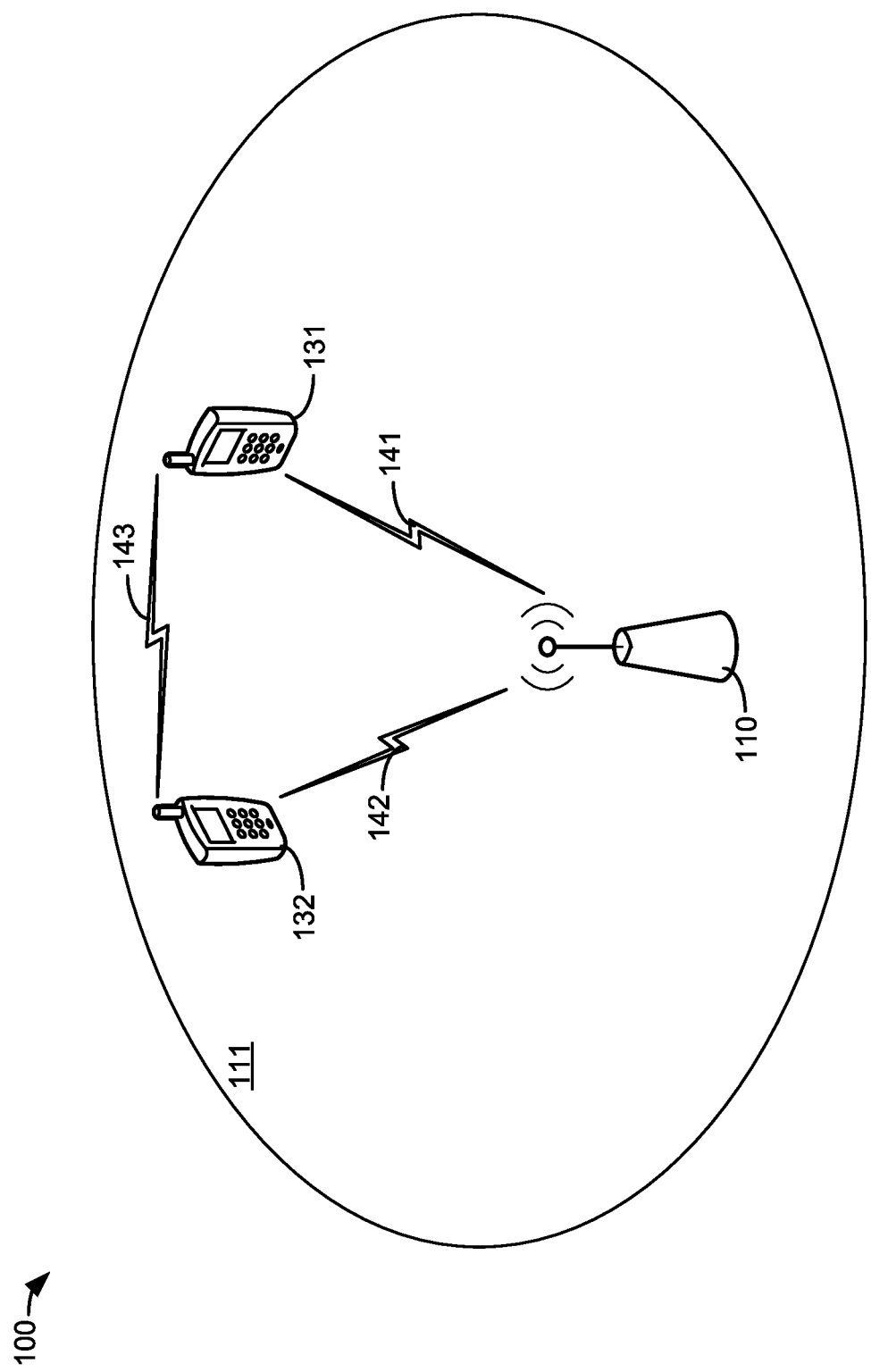
FIG. 1 is a block diagram illustrating a communication system.

In an embodiment, device-to-device (D2D) transmissions by a wireless device may interfere with base station reception of other signals. To mitigate this interference, the wireless device estimates the path loss between itself and the base station. This estimate is based on the transmission power of the base station and the signal strength of the base station's signal as measured by the wireless device. The path loss and the current D2D transmission power level are used to estimate the amount of interference the base station is experiencing as a result of the D2D transmissions from the wireless device. Based on the estimated interference experienced by the base station, the wireless device increases the robustness of the MCS being used and decreases the transmission power level by a corresponding amount. By decreasing the D2D transmission power level, less interference will be experienced by the base station. By increasing the robustness of the MCS, the impact of the reduced D2D transmission power level is mitigated.

In an embodiment, a wireless device monitors which uplink air-interface resources in a frame have been scheduled by the base station for use by wireless devices. The remaining air-interface resources are therefore unscheduled and unused for communication with the base station. The wireless device can use some (or all) of these unused (i.e., unscheduled) uplink air-interface resources for D2D communication.

In an embodiment, wireless systems using time division duplexing may specify frames that have a guard period between uplink subframes and downlink subframes. This guard period is used for time synchronization between the base station and a wireless device. In an embodiment, a wireless device can use some (or all) of the guard periods for D2D communication.

In an embodiment, wireless systems using frequency division duplexing may specify a channel (i.e., frequency band) that is divided into many (e.g., 2048) Orthogonal Frequency Division Multiplexing (OFDM) subcarriers. To limit out-of-band emissions that may interfere with an adjacent channel, some of these subcarriers, particularly at the edges of a channel's frequency range, are designated as guard bands and are not used for communication with the base station. In an embodiment, a wireless device can use some (or all) of these guard subcarriers for D2D communication.

In an embodiment, a base station may broadcast which air-interface resources (i.e., time slots or subcarriers) will not be used for 'regular' base station communication with wireless devices over a subsequent period of time (e.g., number of frames.) This information may be broadcast using system information transmissions (e.g., system information blocks.) The wireless device can use some (or all) of these designated (i.e., unscheduled) uplink air-interface resources for D2D communication.

In an embodiment, some air-interface resources are designated to carry pilot signals (e.g., LTE sounding reference signals or demodulation reference signals) to aid in communication (e.g., for channel estimation, etc.) A wireless device may multiplex a prearranged (e.g., with the other D2D device) orthogonal code onto these pilot signals to use them to carry D2D communication.

FIG. 1 is a block diagram illustrating a communication system. In FIG. 1, communication system 100 comprises access node 110, wireless device 131, and wireless device 132. A wireless device 131-132 each may also be referred to as user equipment, or UE. Access node 110 is illustrated as having coverage area 111. Wireless device 131, and wireless device 132 are located within coverage area 111.

Access node 110 is illustrated as being operatively coupled to wireless device 131 via wireless link 141. Access node 110 is illustrated as being operatively coupled to wireless device 132 via wireless link 142. Wireless device 131 and wireless device 132 are also illustrated as being operatively coupled to each other via wireless link 143. Thus, wireless device 131 and wireless device 132 are configured for device-to-device (D2D) communication via wireless link 143. Wireless link 143 uses the same frequency band as wireless links 141-142. Thus, wireless device 131 and wireless device 132 are configured to use inband D2D communication.

Access node 110 is a network node capable of providing wireless communication to wireless device 131, and/or wireless device 132. Access node 110 can be, for example, one or more of a base transceiver station, a radio base station, an eNodeB device, or an enhanced eNodeB device.

Communication system 100 is a communication network that can provide wireless communication to wireless device 131, and/or wireless device 132. Communication system 100 can comprise wired and/or wireless communication networks that include processing nodes, routers, gateways, physical and/or wireless data links for carrying data among various network elements, including combinations thereof, and can include a local area network, a wide area network, and an internetwork (including the Internet). Communication system 100 can also comprise wireless networks, including base station, wireless communication nodes, telephony switches, internet routers, network gateways, computer systems, communication links, or some other type of communication equipment, and combinations thereof.

Wired network protocols that may be utilized by communication system 100 may comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Wireless network protocols that may be utilized by communication system 100 may comprise code division multiple access (CDMA) 1xRTT, Global System for Mobile communications (GSM), Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), and Worldwide Interoperability for Microwave Access (WiMAX).

Links between elements of communication system 100, can be, for example, twisted pair cable, coaxial cable or fiber optic cable, or combinations thereof. Wireless link 141, wireless link 142, and/or wireless link 143 can be a radio frequency, microwave, or other similar signal. Wireless link 141, wireless link 142, and/or wireless link 143 can use a suitable communication protocol, for example, Global System for Mobile telecommunications (GSM), Code Division Multiple Access (CDMA), Worldwide Interoperability for Microwave Access (WiMAX), or Long Term Evolution (LTE), or combinations thereof. Other wireless protocols can also be used.

Other network elements may be present in communication system 100 to facilitate wireless communication to/from access node 110, wireless device 131 and/or wireless device 132, but are omitted for clarity, such as base stations, base station controllers, gateways, mobile switching centers, dispatch application processors, and location registers such as a home location register or visitor location register. Furthermore, other network elements may be present to facilitate communication between among elements of communication system 100 which are omitted for clarity, including additional processing nodes, routers, gateways, and physical and/or wireless data links for carrying data among the various network elements.

Wireless device 131, and/or wireless device 132 may be any device, system, combination of devices, or other such communication platform capable of communicating wirelessly with access node 110, and with each other using D2D wireless link 143. Wireless device 131 and/or wireless device 132 may be, for example, a mobile phone, a wireless phone, a wireless modem, a personal digital assistant (PDA), a voice over internet protocol (VoIP) phone, a voice over packet (VOP) phone, or a soft phone, as well as other types of devices or systems that can exchange audio or data via access node 110, and can also communicate directly with each other (i.e., capable of D2D communication.) Other types of communication platforms are possible.

In an embodiment, the device-to-device (D2D) transmissions between wireless device 131 and wireless device 132 via wireless link 143 may interfere with the reception of other signals by access node 110 (e.g., reception of signals via wireless link 141 and/or wireless link 142). To mitigate this interference, wireless device 131 estimates the path loss between itself and the base station. This estimate is based on the transmission power of access node 110 and the signal strength of transmissions from access node 110 as measured by wireless device 131. The path loss estimate and the current D2D transmission power level used by wireless device 131 are used to estimate the amount of interference access node 110 is experiencing as a result of the D2D transmissions from wireless device 131. Based on the estimated interference experienced by access node 110, wireless device 131 can increase the robustness of the MCS being used for D2D transmissions and decrease D2D power level by a corresponding amount. By decreasing the D2D transmission power level, less interference will be experienced by access node 110. By increasing the robustness of the MCS, the impact of the reduced D2D transmission power on D2D communication via wireless link 143 level is mitigated.

Wireless device 131 receives a first indicator that corresponds to the transmission power being used by access node 110. This first indicator may be broadcast by access node 110 in, for example, a system information block (SIB). Wireless device 131 measures a second indicator that corresponds to the signal power of transmissions from access node 110 as received by wireless device 131.

Based on these two indicators, wireless device 131 calculates an estimated signal strength corresponding to the signal power of D2D transmissions from wireless device 131 as received by access node 110. This estimate may rely on the principle of channel reciprocity.

Wireless device 131 estimates the path loss ($PL_{est}$) as the difference between the broadcast transmission power of access node 110, and the received signal strength of known strength transmissions from access node 110, as measured by wireless device 131. Wireless device 131 may estimate the path loss ($PL_{est}$) as the difference between the transmission power of reference signals sent by access node 110 (ReferenceSignalPower), and the signal strength (RSRP) of these reference signals as measured by wireless device 131. In other words, to estimate (or calculate) the path loss: $PL_{est}$=ReferenceSignalPower−RSRP.

Wireless device 131 estimates the signal power of D2D transmissions by wireless device 131 arriving at access node 110. Wireless device 131 estimates the signal power of D2D transmissions by wireless device 131 arriving at access node 110 (P_val) by subtracting the D2D transmission power ($PWR_{D2D}$) being used by wireless device 131 to communicate with wireless device 132 from the estimated path loss ($PL_{est}$). In other words, to estimate the signal power of D2D transmissions by wireless device 131 arriving at access node 110: P_val=$PWR_{D2D}$−$PL_{est}$.

Wireless device 131 also estimates the baseline interference level at access node 110. This estimate can be based on the cellular channel bandwidth, and a noise figure associated with access node 110. In other words, to estimate the interference level (BS noise level) at access node 110: BS_noise_level(dBm)=−174 dBm/Hz+BS_noise_figure+10*log(channel bandwidth).

Wireless device 131 also estimates the interference level rise (IOT) over the baseline interference level (BS_noise_level) experienced by access node 110. In other words, to estimate the interference level rise (IOT) experienced at access node 110 as a result of the D2D transmissions by wireless device 131: IOT(dBm)=P_val−BS_noise_level.

If the interference level rise (IOT) is negative (i.e., the D2D transmissions by wireless device 131 do not exceed the baseline interference level associated with access node 110), then wireless device 131 does not adjust the D2D transmission power level or the D2D MCS. If the interference level rise (IOT) is positive (i.e., the estimated signal strength of D2D transmissions arriving at access node 110 meets a threshold criteria), then wireless device 131 reduces the power of, and also increases the redundancy of, the D2D transmissions made by wireless device 131. This reduction of transmission power and corresponding increase in MCS can be selected according to Table 1.

TABLE 1

| MCS | Req'd SNR for MCS |
|---|---|
| Level 0 | 0 dB |

TABLE 1-continued

| MCS | Req'd SNR for MCS |
|---|---|
| Level 1 | 5 dB |
| Level 2 | 10 dB |
| Level 3 | 15 dB |

For example, if the current MCS for D2D transmissions from wireless device 131 is level 3, and the required power reduction is 5 dB in order to reduce the interference experienced by access node 110 as a result of the D2D transmissions from wireless device 131 to below the baseline interference level (i.e., BS_noise_level), wireless device 131 will reduce, by at least 5 dB, the D2D transmission power level, and also change the MCS from level 3 to level 2. In another example, if the current MCS is level 3, and a 7 dB power reduction is needed to reduce the D2D transmissions (as measured at access node 110) to below the baseline interference level, wireless device 131 will reduce, by at least 7 dB, the D2D transmission power level, and also change the MCS from level 3 to level 1. In another example, if the current MCS is level 3, and an 11 dB D2D transmission power reduction is needed, wireless device 131 will reduce, by at least 11 dB, the D2D transmission power level, and also change the MCS from level 3 to level 0.

In an embodiment, wireless device 131 and wireless device 132 monitor which uplink air-interface resources (e.g., slots) in a frame have been scheduled by access node 110 for use by wireless devices 131-132 (and/or other wireless devices not shown in FIG. 1) to transmit to access node 110. The remaining uplink air-interface resources are therefore unscheduled and unused for transmissions to access node 110. Wireless device 131 and wireless device 132 can use some (or all) of these unused (i.e., unscheduled) uplink air-interface resources for D2D communication.

Wireless device 131 and wireless device 132 are configured to communicate directly with each other via wireless link 143. Access node 110 is configured to schedule uplink air-interface resources among the wireless devices that access node 110 is servicing. At least wireless device 131 receives indicators of the scheduled uplink air-interface resources from access node 131. These indicators may be sent by access node 110 in response to requests for uplink air-interface resources made by the wireless devices that access node 110 is servicing.

By examining these indicators, wireless device 131 can determine which (if any) uplink air-interface resources are unscheduled and therefore are (at the corresponding time and/or frequency) going to be unused. Wireless device 131 uses at least one of these unscheduled air-interface resources (e.g., an unscheduled time and frequency slot) to transmit directly to wireless device 132.

In an embodiment, access node 110 may be configured to use time division duplexing on wireless links 141-142. The time division duplexing (TDD) used by access node 110 may specify frames that have a guard period between uplink subframes and downlink subframes. This guard period may be used for time synchronization between access node 110 and a wireless device 131-132. Wireless device 131 uses some (or all) of a guard period for D2D transmissions over wireless link 143.

In an embodiment, access node 110 may be configured to use frequency division duplexing (FDD) on wireless links 141-142. The FDD used by access node 110 may specify a channel (i.e., frequency band) that is divided into many (e.g., 2048) Orthogonal Frequency Division Multiplexing (OFDM) subcarriers. To limit out-of-band emissions that may interfere with an adjacent channel, some of these subcarriers, particularly at the edges of a channel's frequency range, are designated as guard bands and are not used for communication with access node 110. In an embodiment, wireless device 131 an uses some (or all) of these guard subcarriers for D2D transmissions over wireless link 143.

In an embodiment, access node 110 may broadcast which air-interface resources (i.e., time slots or subcarriers) will not be used for non-D2D communication from wireless devices over a subsequent period of time (e.g., number of frames—also broadcast by access node 110). The information that specifies which air-interface resource are to be unscheduled (and therefore unused for communication with access node 110) may be broadcast by access node 110 using system information transmissions (e.g., system information blocks). Wireless device 131 can use some (or all) of these designated uplink air-interface resources for D2D transmissions over wireless link 143.

In an embodiment, access node 110 is configured to use some air-interface resources to carry pilot signals (e.g., LTE sounding reference signals or demodulation reference signals) to aid in communication (e.g., for channel estimation, etc.) Wireless device 131 multiplexes a prearranged (e.g., with wireless device 132) an orthogonal code onto these pilot signals. This allows wireless device 131 and wireless device 132 to use these air-interface resource to carry D2D communication.

Figure 2:
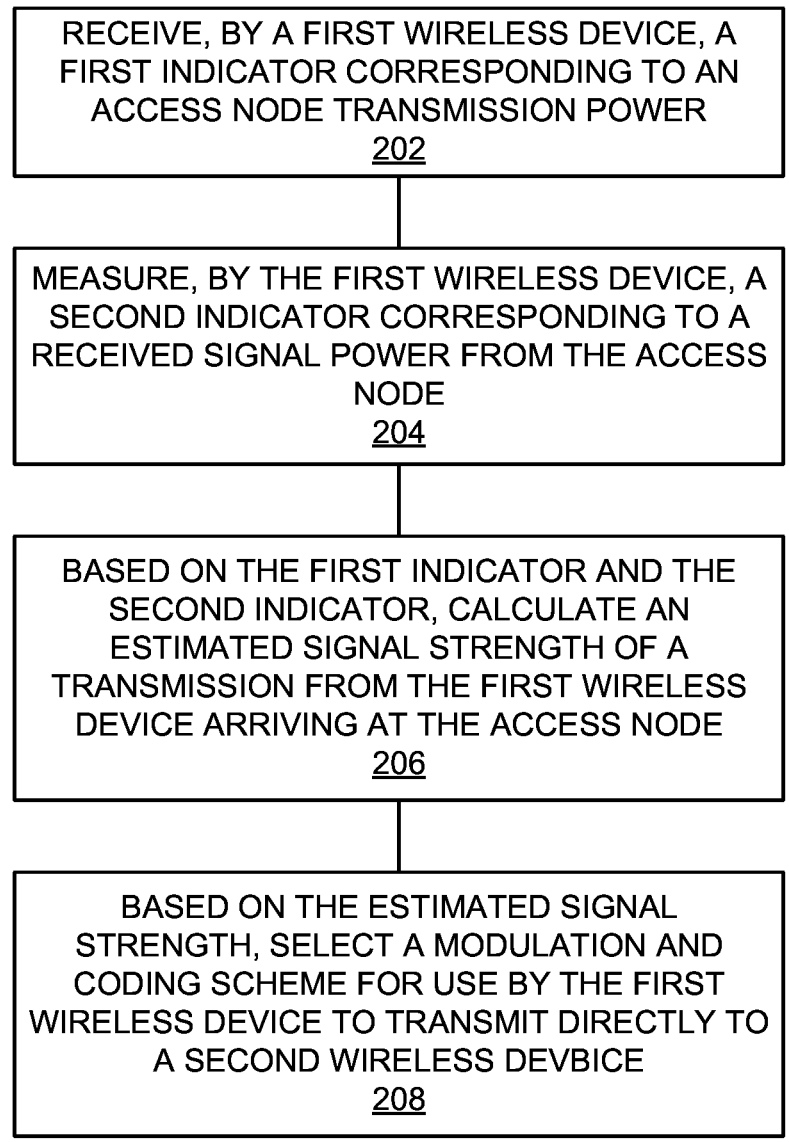
FIG. 2 is a flowchart illustrating a method of selecting a modulation and coding scheme for device-to-device communication.

FIG. 2 is a flowchart illustrating a method of selecting a modulation and coding scheme for device-to-device communication. The steps illustrated in FIG. 2 may be performed by one or more elements of communication system 100. By a first wireless device, a first indicator corresponding to and access node transmission power is received (202). For example, Wireless device 131 may receive a first indicator that corresponds to the transmission power being used by access node 110. This first indicator may be broadcast by access node 110.

By the first wireless device, a second indicator corresponding to a received signal power from the access node is measured (204).

Wireless device 131 measures a second indicator that corresponds to the signal power of transmissions from access node 110 as received by wireless device 131. For example, wireless device 131 may measure a second indicator that corresponds to the signal power of transmissions from access node 110 as received by wireless device 131.

Based on the first indicator and the second indicator, an estimated signal strength of a transmission from the first wireless device arriving at the access node is calculated (206). For example, wireless device 131 may calculate an estimated signal strength corresponding to the signal power of D2D transmissions from wireless device 131, as received by access node 110.

Based on the estimated signal strength, a modulation and coding scheme for use by the first wireless device to transmit directly to the second wireless device is selected (208). For example, if the estimated signal strength of D2D transmissions from wireless device 131 exceed the baseline interference level associated with access node 110 (i.e., meet a threshold criteria), then wireless device 131 may reduce the power of, and also increases the redundancy of (by a corresponding amount), the D2D transmissions made by wireless device 131.

Figure 3:
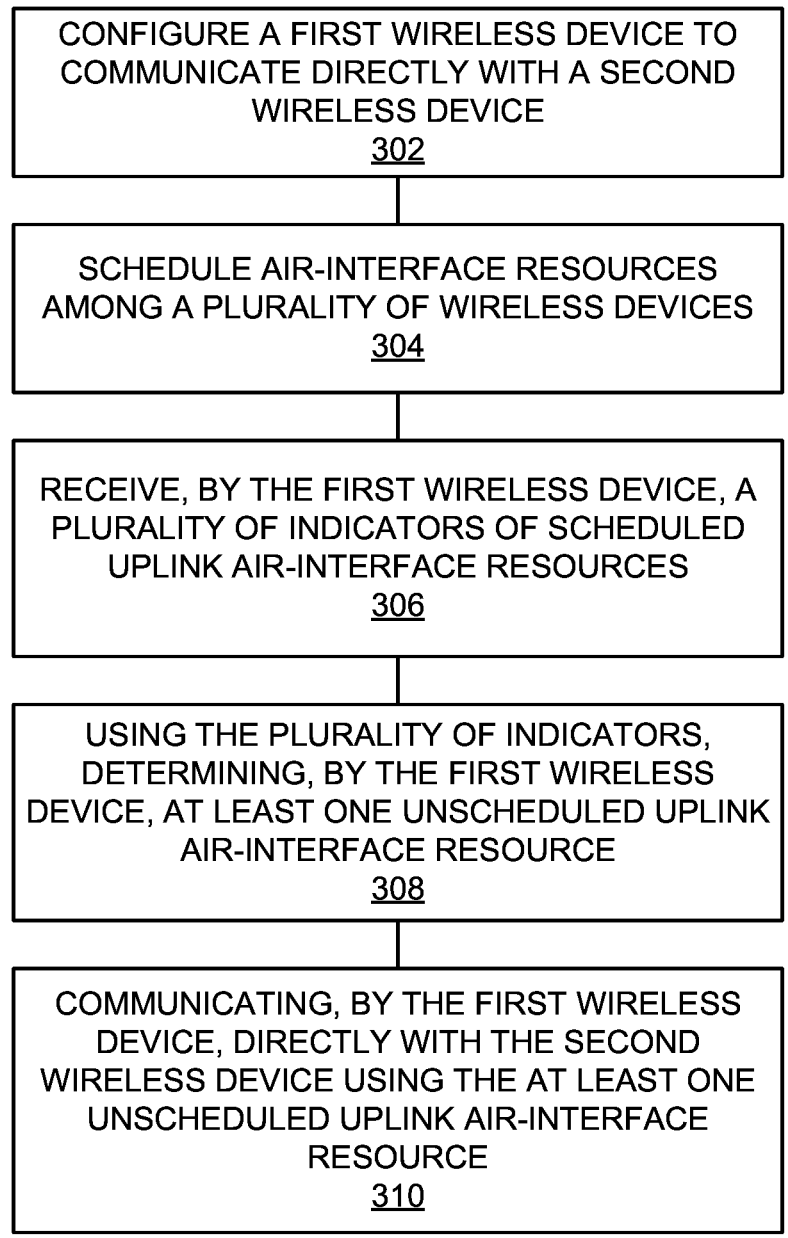
FIG. 3 is a flowchart illustrating a method of using unscheduled air-interface resources for device-to-device communication.

FIG. 3 is a flowchart illustrating a method using unscheduled air-interface resources for device-to-device communication. The steps illustrated in FIG. 3 may be performed by one or more elements of communication system 100. A first wireless device is configured to communicate directly with a second wireless device (302). For example, wireless device 131 may be configured to communicate directly with wireless device 132 via wireless link 143.

Air-interface resources are scheduled among a plurality of wireless devices (304). For example, access node 110 may schedule uplink air-interface resources to be used by wireless devices 131-132 to transmit to access node 110. Access node 110 may transmit (e.g., to wireless device 131 and wireless device 132) indicators that reflect the scheduling of these uplink air-interface resources (and their assignment to a respective wireless device 131-132.)

By the first wireless device, a plurality of indicators of scheduled uplink air-interface resources are received (306). For example, wireless device 131 may receive, from access node 110, a plurality of indicators that correspond to which of the scheduled uplink air-interface resources have been scheduled (and are therefore going to be used.)

The plurality of indicator are used to determine, by the first wireless device, at least one unscheduled uplink air-interface resource (308). For example, wireless device 131 can determine, from the plurality of indicators that correspond to which of the scheduled uplink air-interface resources have been scheduled, which uplink air-interface resources have not been scheduled (and are therefore are not going to be used.)

By the first wireless device, the second wireless device is communicated with using the at least one unscheduled uplink air-interface resource (310). For example, wireless device 131 can use some (or all) of the unused (i.e., unscheduled) uplink air-interface resources determined in block 308 for D2D communication.

Figure 4:
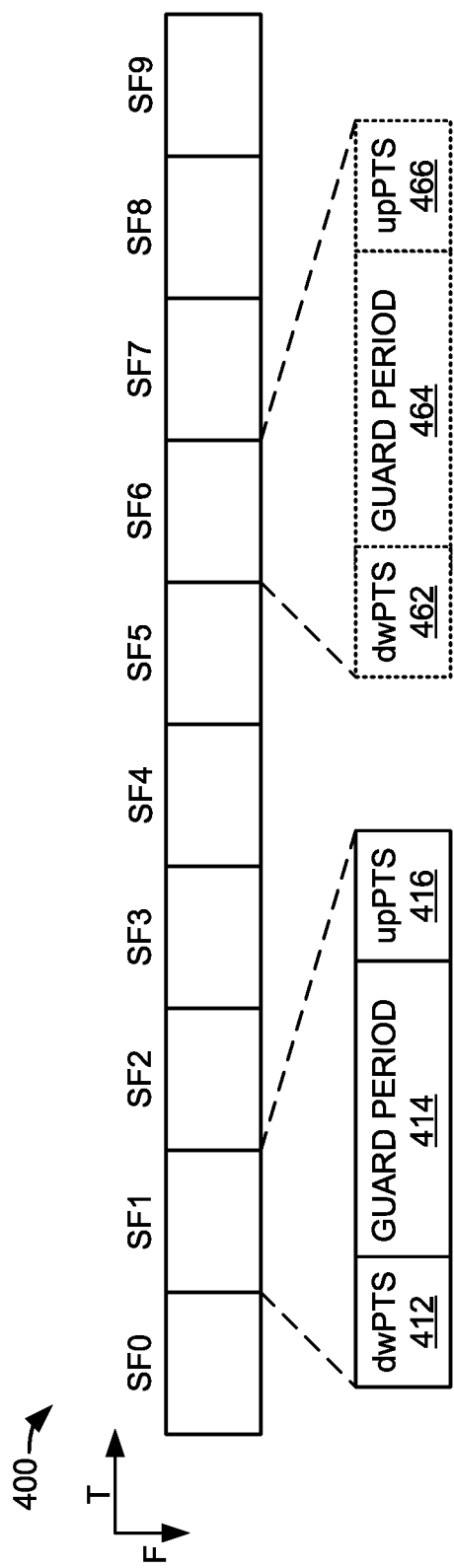
FIG. 4 is diagram illustrating guard period resources usable for device-to-device communication.

FIG. 4 is diagram illustrating guard period resources usable for device-to-device communication. The air-interface resource format, and guard period resources in particular, illustrated in FIG. 4 may be used by one or more elements of communication system 100. In FIG. 4, a TDD frame 400 is illustrated. TDD frame 400 comprises ten (10) subframes SF0-SF9 that are contiguous in time. Subframe SF1 includes downlink pilot timeslot (dwPTS) 412, guard period 414, and uplink pilot timeslot 416 (upPTS). Subframe SF6 may optionally (depending upon a configuration) include downlink pilot timeslot 462, guard period 464, and uplink pilot timeslot 466. In an embodiment, guard period 414 and guard period 464 are not used for transmissions by an access node (e.g., access node 110), or by wireless devices (e.g., wireless devices 131-132) to transmit to the access node. In an embodiment, wireless device 131 and/or wireless device 132 may transmit during guard period 414 and/or guard period 464 for D2D transmissions via wireless link 143.

Figure 5:
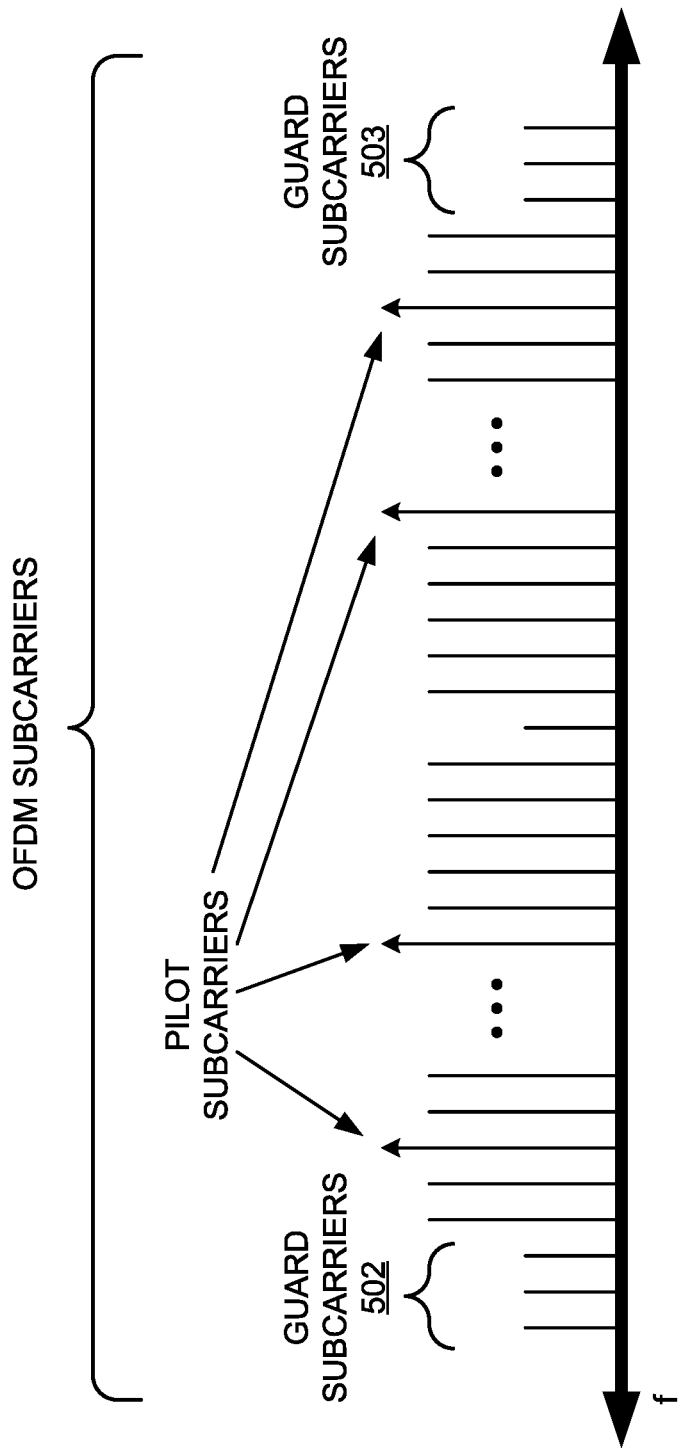
FIG. 5 is a diagram illustrating guard band resources usable for device-to-device communication.

FIG. 5 is a diagram illustrating guard band resources usable for device-to-device communication. The OFDM subcarrier allocation, and guard band resources in particular, illustrated in FIG. 5 may be used by one or more elements of communication system 100. To limit out-of-band emissions that may interfere with an adjacent channel, guard subcarriers 502-503, are designated as guard bands and are not used for communication with an access node. In an embodiment, wireless device 131 and/or wireless device 132 may transmit using guard subcarriers 502-503 for D2D transmissions via wireless link 143. For example, guard subcarriers 502 may be used by wireless device 131 for D2D transmissions to wireless device 132. Guard subcarriers 503 may be used by wireless device 132 for D2D transmissions to wireless device 131.

Figure 6:
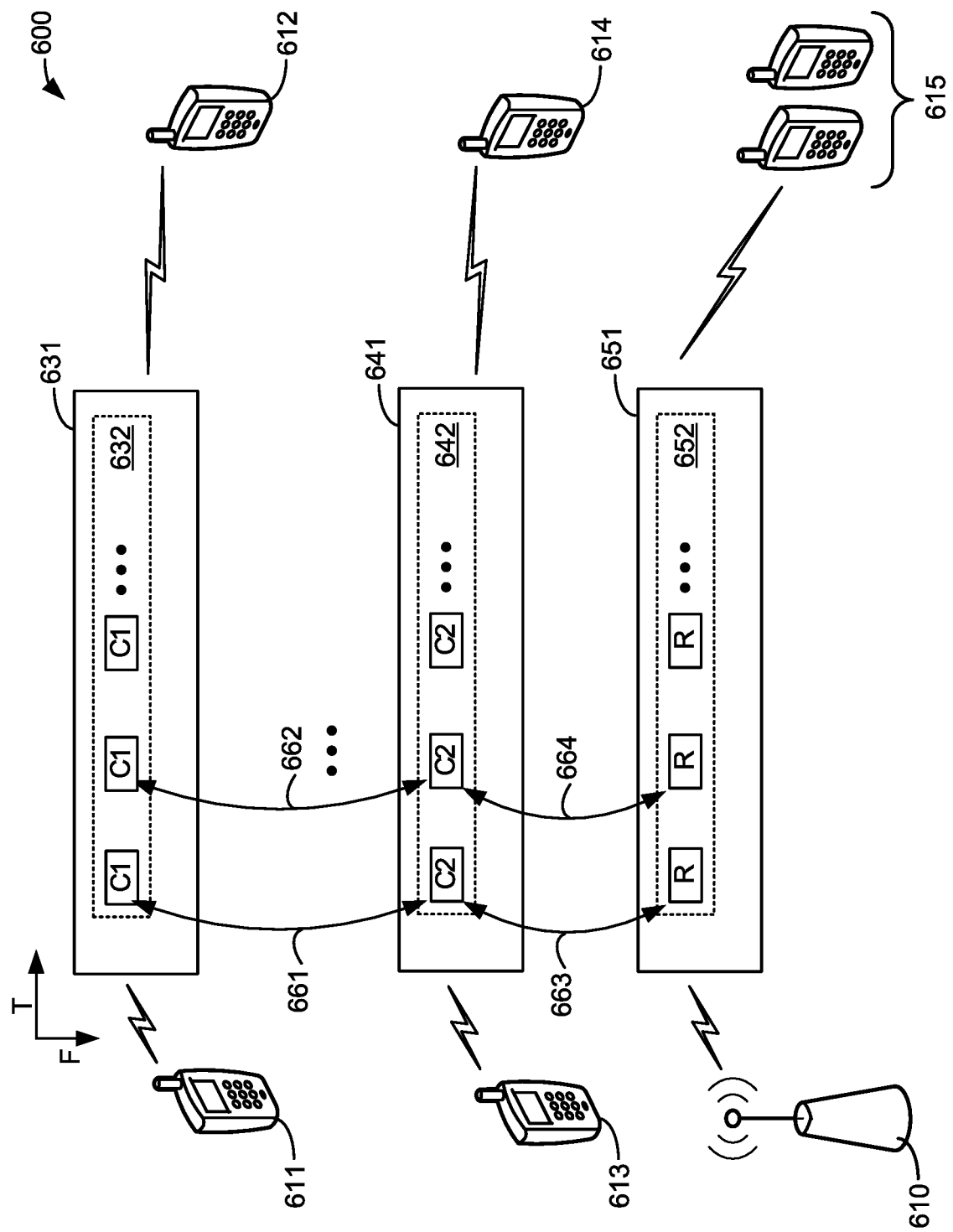
FIG. 6 is a diagram illustrating reference signal resources usable for device-to-device communication.

FIG. 6 is a diagram illustrating reference signal resources usable for device-to-device communication. In FIG. 6, communication system 600 includes access node 610, wireless device 611, wireless device 612, wireless device 613, wireless device 614, and wireless devices 615.

Wireless device 611 transmits subframe 631 directly to wireless device 612. Wireless device 613 transmits subframe 641 to wireless device 614. Access node 610 transmits subframe 651 to wireless devices 615.

Subframe 631 includes reference signal resource elements 632. Subframe 641 includes reference signal resource elements 642. Subframe 651 includes reference signal resource elements 652. In an embodiment, at least some of the reference signal resource elements in subframe 631 overlap, in time and frequency, reference signal resource elements in subframes 641 and 651. This is illustrated in FIG. 6 by arrows 661-664.

In an embodiment, an orthogonal code of a family of orthogonal codes is multiplexed, by wireless device 611, onto reference signal resource elements 632 of subframe 631. Likewise, the orthogonal code is multiplexed onto reference signal resource elements 642 of subframe 641. Because the orthogonal code is orthogonal to the signals transmitted by access node 610 in reference signal resource elements 652, the interference between reference signal resource elements 632 and reference signal resource elements 651 is mitigated. This allows the orthogonally coded (and information bearing) reference signal resource elements 632 and 642 to be used for D2D transmissions between wireless devices 611-614.

The methods, systems, devices, networks, access nodes, processing node, control nodes, and equipment described above may be implemented with, contain, or be executed by one or more computer systems and/or processing nodes. The methods described above may also be stored on a non-transitory computer readable medium. Many of the elements of communication system 300, and/or communication system 600 may be, comprise, or include computers systems and/or processing nodes. This includes, but is not limited to: access node 110, wireless device 131, wireless device 132, access node 610, wireless device 611, wireless device 612, wireless device 613, wireless device 614, and/or wireless devices 615.

Figure 7:
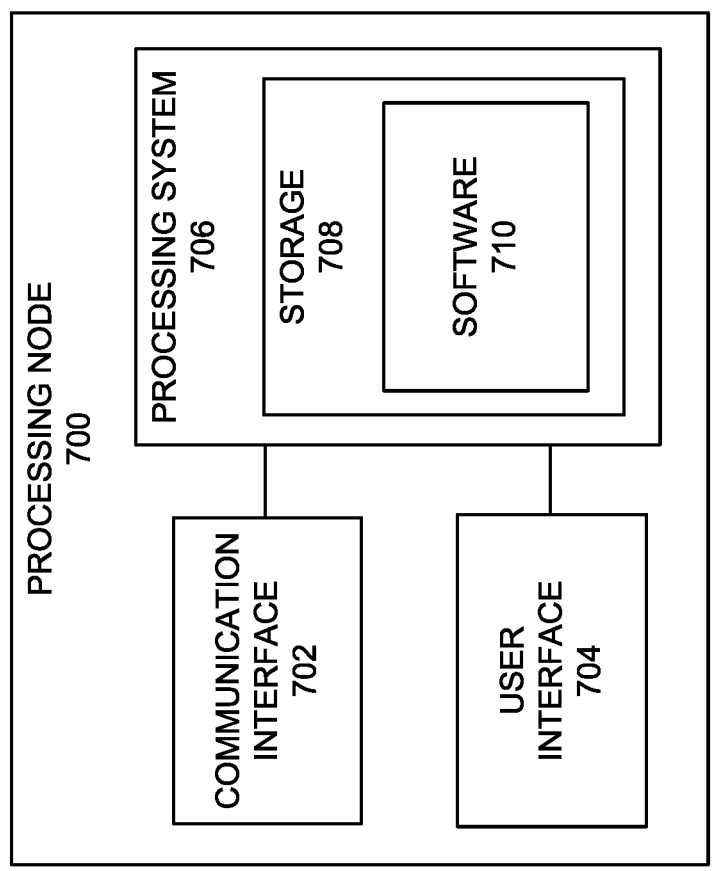
FIG. 7 illustrates a processing node.

FIG. 7 illustrates an exemplary processing node 700 comprising communication interface 702, user interface 704, and processing system 706 in communication with communication interface 702 and user interface 704. Processing node 700 is capable of paging a wireless device. Processing system 706 includes storage 708, which can comprise a disk drive, flash drive, memory circuitry, or other memory device. Storage 708 can store software 710 which is used in the operation of the processing node 700. Storage 708 may include a disk drive, flash drive, data storage circuitry, or some other memory apparatus. Software 710 may include computer programs, firmware, or some other form of machine-readable instructions, including an operating system, utilities, drivers, network interfaces, applications, or some other type of software. Processing system 706 may include a microprocessor and other circuitry to retrieve and execute software 710 from storage 708. Processing node 700 may further include other components such as a power management unit, a control interface unit, etc., which are omitted for clarity. Communication interface 702 permits processing node 700 to communicate with other network elements. User interface 704 permits the configuration and control of the operation of processing node 700.

An example of processing node 700 includes wireless device 131. Processing node 700 can also be an adjunct or component of a network element, such as an element of access node 110, access node 610, a mobility management entity, a gateway, a proxy node, or another network element in a communication system.

The exemplary systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium can also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a communication system, comprising:
configuring a first wireless device to communicate directly with a second wireless device;
scheduling uplink air-interface resources among a plurality of wireless devices;
receiving, by the first wireless device, a plurality of indicators of scheduled uplink air-interface resources;
using the plurality of indicators, determining, by the first wireless device, at least one unscheduled uplink air-interface resource; and,
communicating, by the first wireless device, directly with the second wireless device using the at least one unscheduled uplink air-interface resource for device-to-device communication to transmit data between the first and second wireless device,
wherein the at least one unscheduled uplink air-interface resource comprises a guard resource comprising one or both of a guard period and a guard band for the device-to-device communication, the data transmitted between the first and second wireless devices via the guard resource.

2. The method of claim 1, further comprising:

transmitting the plurality of indicators of scheduled uplink air-interface resources to the plurality of wireless devices.

3. The method of claim 2, wherein the plurality of indicators corresponds to responses to uplink air-interface resource requests.

4. The method of claim 3, wherein:
the uplink air-interface resource requests are made by the plurality of wireless devices; and
the plurality of wireless devices comprises the first wireless device and the second wireless device.

5. The method of claim 1, wherein:
the communication system comprises a frequency-division duplex communication system;
the at least one unscheduled uplink air-interface resource comprises unscheduled uplink channel resources in the frequency-division duplex communication system; and
the guard resource comprises a gap band.

6. The method of claim 1, wherein:
the communication system comprises a time-division duplex communication system;
the at least one unscheduled uplink air-interface resource comprises to unscheduled uplink time-frame resources in the time-division duplex communication system; and
the guard resource comprises a gap period.

7. The method of claim 1, wherein the communication system comprises a frequency division duplexing communication system and the guard resource comprises the guard band.

8. The method of claim 7, wherein the uplink air-interface resources comprise orthogonal frequency division multiplexing (OFDM) subcarriers and the guard band comprises guard subcarriers.

9. The method of claim 7, wherein the uplink air-interface resources comprise a frequency band and the guard band comprises guard subcarriers located at edges of the frequency band.

10. The method of claim 1, wherein the communication system comprises a time division duplexing communication system and the guard resource comprises the guard period, wherein the guard period is between uplink subframes and downlink subframes.

11. The method of claim 1, wherein the at least one unscheduled uplink air-interface resource further comprises pilot signals and the method further comprises multiplexing, by the first wireless device, an orthogonal code on the pilot signals to communicate directly with the second wireless device.

12. The method of claim 1, further comprising estimating, by the first wireless device, an interference level at an access node caused by device-to-device transmissions from the first wireless device to the second wireless device, wherein the plurality of indicators of scheduled uplink air-interface resources is received from the access node.

13. The method of claim 12, further comprising selecting, by the first wireless device, a device-to-device transmission power level for transmissions to the second wireless device based on the estimate of the interference level at the access node caused by the device-to-device transmissions from the first wireless device to the second wireless device.

14. The method of claim 12, further comprising selecting, by the first wireless device, a device-to-device modulation and coding scheme (MCS) for transmissions to the second wireless device based on the estimate of the interference level at the access node caused by the device-to-device transmissions from the first wireless device to the second wireless device.

15. A communication system, comprising:
an access node to send indicators of scheduled uplink air-interface resources to a plurality of wireless devices; and,
a first wireless device configured to receive the indicators of scheduled uplink air-interface resources and determine at least one unscheduled uplink air-interface resource that can be used by the first wireless device for device-to-device communication to transmit data between the first wireless device and a second wireless device, the plurality of wireless devices comprising the first wireless device and comprising the second wireless device,
wherein the at least one unscheduled uplink air-interface resource comprises a guard resource comprising one or both of a guard period and a guard band for the device-to-device communication, the data transmitted between the first and second wireless devices via the guard resource.

16. The communication system of claim 15, wherein the first wireless device is further configured to estimate an interference level at the access node caused by device-to-device transmissions from the first wireless device to the second wireless device.

17. The communication system of claim 16, wherein the first wireless device is further configured to select a device-to-device transmission power level for transmissions to the second wireless device based on the estimate of the interference level at the access node caused by the device-to-device transmissions from the first wireless device to the second wireless device.

18. The communication system of claim 16, wherein the first wireless device is further configured to select a device-to-device modulation and coding scheme (MCS) for transmissions to the second wireless device based on the estimate of the interference level at the access node caused by the device-to-device transmissions from the first wireless device to the second wireless device.

19. The communication system of claim 16, wherein the first wireless device is further configured to, based on the estimate of the interference level at the access node caused by the device-to-device transmissions from the first wireless device to the second wireless device, select a device-to-device transmission power level and a device-to-device modulation and coding scheme (MCS) for transmissions to the second wireless device.

20. The communication system of claim 19, wherein the first wireless device is further configured to, based on an indicator corresponding to a transmission power being used by the access node, select the device-to-device transmission power level and the device-to-device modulation and coding scheme (MCS).

* * * * *